United States Patent
Daineche et al.

(10) Patent No.: US 11,055,237 B2
(45) Date of Patent: Jul. 6, 2021

(54) METHOD OF ACCESS TO A MEMORY

(71) Applicants: STMicroelectronics (Rousset) SAS, Rousset (FR); STMicroelectronics (Grenoble 2) SAS, Grenoble (FR)

(72) Inventors: Layachi Daineche, Boue-bel-Air (FR); Xavier Chbani, Grenoble (FR); Nadia Van-Den-Bossche, Meylan (FR)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 2 days.

(21) Appl. No.: 16/594,210

(22) Filed: Oct. 7, 2019

(65) Prior Publication Data

US 2020/0110713 A1 Apr. 9, 2020

(30) Foreign Application Priority Data

Oct. 9, 2018 (FR) ...................................... 1871152

(51) Int. Cl.
*G06F 21/79* (2013.01)
*G06F 12/14* (2006.01)
*G06F 9/4401* (2018.01)
*G06F 21/62* (2013.01)

(52) U.S. Cl.
CPC ........ *G06F 12/1458* (2013.01); *G06F 9/4403* (2013.01); *G06F 21/6218* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 2016/0299720 A1 | 10/2016 | Berntsen et al. | |
| 2019/0042473 A1* | 2/2019 | Bhaskar | G06F 21/602 |
| 2019/0042712 A1* | 2/2019 | Loisel | G06F 21/14 |
| 2019/0361073 A1* | 11/2019 | Trantham | G06F 11/00 |

FOREIGN PATENT DOCUMENTS

EP 2637124 A2 9/2013

OTHER PUBLICATIONS

INPI Search Report and Written Opinion for FR 1871152 dated Aug. 16, 2019 (11 pages).

* cited by examiner

*Primary Examiner* — Brian R Peugh
(74) *Attorney, Agent, or Firm* — Crowe & Dunlevy

(57) ABSTRACT

In a non-volatile memory of a microcontroller, first information representative of a value selected among at least four values is stored. Furthermore, for each of a plurality of areas of the memory, second information representative of a type selected among two types is also stored. Access to each of the areas is conditioned according to the selected value and to the type of the area.

30 Claims, 4 Drawing Sheets

METHOD OF ACCESS TO A MEMORY

PRIORITY CLAIM

This application claims the priority benefit of French Application for Patent No. 1871152, filed on Oct. 9, 2018, the contents of which are hereby incorporated by reference in their entirety to the maximum extent allowable by law.

TECHNICAL FIELD

The present disclosure generally concerns the field of electronic circuits, and more particularly the field of microcontrollers.

BACKGROUND

Microcontrollers comprising non-volatile memories are known in the art where one or a plurality of application programs which, when they are read and executed by a microprocessor of the microcontroller, cause the implementation of the corresponding applications.

There is a need to control the access to areas of a non-volatile memory of a microcontroller, for example, to prevent the access to confidential information stored in the memory.

There further exists a need to allow the development of a program of an application by using tools enabling to identify malfunctions of the application when the program is executed by a microcontroller, while maintaining the confidentiality of certain areas of a non-volatile memory of the microcontroller.

SUMMARY

An embodiment overcomes all or part of the disadvantages of known methods of access to a memory, in particular to a non-volatile memory of a microcontroller.

An embodiment provides a method comprising the steps of: storing, in a non-volatile memory of a microcontroller, first information representative of a value selected among at least four values and, for each of a plurality of areas of the memory, second information representative of a type selected among two types; and conditioning the access to each of said areas according to the selected value and to the type of the area.

According to an embodiment, the access to each of said areas is further conditioned by the fact that the access is initiated by a debugger connected to the microcontroller.

According to an embodiment, the access to the areas of a first one of the two types is authorized and the access to the areas of a second one of the two types is forbidden when the selected value is a first value and the access is initiated by a debugger connected to the microcontroller.

According to an embodiment, the access to the areas of the first and second types is authorized when the selected value is a second value.

According to an embodiment, a change in the selected value from the first value to the second value is forbidden or causes the deleting of each of said areas.

According to an embodiment, the access to each of said areas is further conditioned by a detection of an intrusion when the selected value is a third value, an intrusion being preferably detected when a debugger is connected to the microcontroller and/or when a microcontroller boot program is read from another source than the non-volatile memory.

According to an embodiment, the access to the areas of the first and second types is forbidden when an intrusion is detected and the selected value is the third value.

According to an embodiment, a change in the selected value from the third value to the first value causes the deleting of each of the areas of the first type only and, preferably, a reboot of the microcontroller and/or a deleting of each non-volatile memory of the microcontroller.

According to an embodiment, when the selected value is a fourth value, the connection of a debugger to the microcontroller is deactivated, preferably the execution of a boot program from another source than the memory being also deactivated.

According to an embodiment, a change in the selected value from the first, second, or third value to the fourth value is irreversible.

According to an embodiment, each access to each of said areas is of one character among two characters, the access to the area being further conditioned by the character of the access.

According to an embodiment, an area of the first type is accessible by an access of a first or optionally of a second one of the two characters, an area of the second type being only accessible by an access of the second character.

According to an embodiment, the method further comprises the steps of: programming, for each address seen by a microprocessor of the microcontroller, non-volatilely in the microcontroller and/or in a microcontroller boot program, third information representative of a category selected among two categories; and conditioning the access to each of said addresses according to the selected value and to the category of the address, preferably by authorizing the access to the addresses of a first one of the two categories only if the access to the areas of the first type is authorized and the access to the addresses to a second one of the two categories only if the access to the areas of the second type is authorized.

Another embodiment provides a non-volatile memory, preferably of flash type, configured to implement the above method.

Another embodiment provides a microcontroller comprising a memory such as defined hereabove, the microcontroller being configured to implement the above method.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
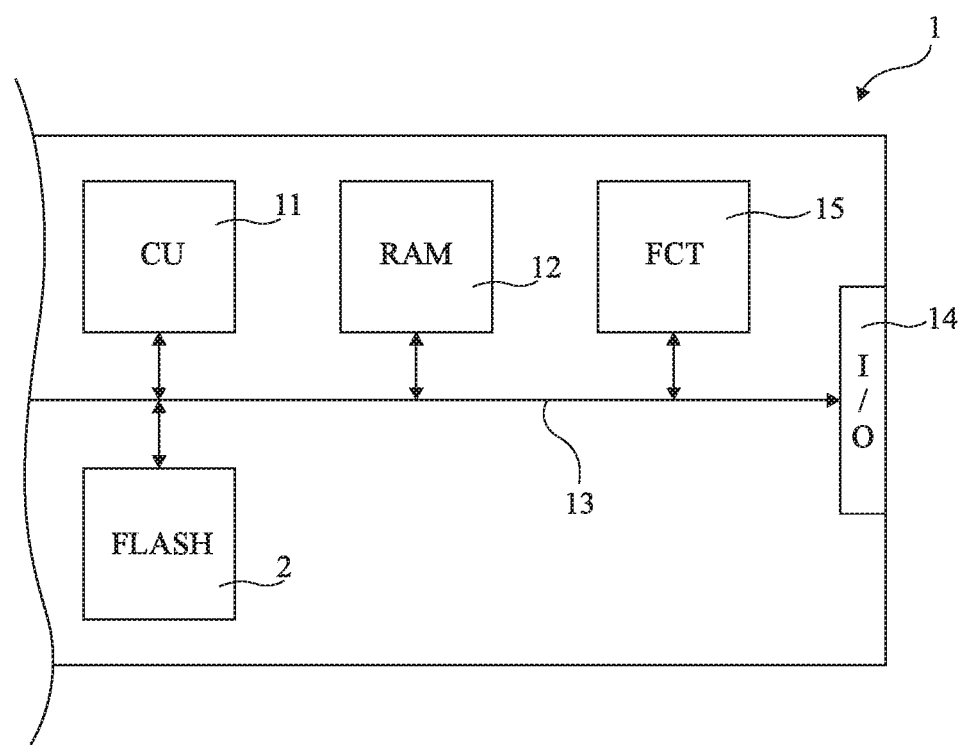
FIG. 1 very schematically shows in the form of blocks an embodiment of a microcontroller.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the various circuits or elements constitutive of a microcontroller and the operation of a microcontroller have not been described in detail, the described embodiments being compatible with usual microcontrollers and their operations.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

FIG. 1 very schematically shows, in the form of blocks, an example of a microcontroller 1 of the type to which the embodiments which will be described apply as an example.

Microcontroller 1 comprises: a microprocessor 11 (CU); one or a plurality of volatile storage areas 12 (RAM), for example of RAM or register type, that are configured to temporarily store information (instructions, addresses, data); one or a plurality of non-volatile storage areas, including at least one flash-type memory 2 (FLASH) configured to store information when the microcontroller is not powered; one or a plurality of data, address, and/or control buses for making connection between the different elements internal to microcontroller 1, the various buses being here shown in the form of a single bus 13; and one or a plurality of input-output interface 14 (I/O) for communicating with the outside of microcontroller 1.

Further, microcontroller 1 may integrate other functions, symbolized by a block 15 (FCT), for example, a crypto-processor, other interfaces, other memories, etc.

Flash memory 2 is configured to store an initial program, or boot program. A boot program is the first program read and executed by microprocessor 11 at the booting of the microcontroller 1, that is, when microcontroller is booted or rebooted. Flash memory 2 is further configured to store at least one program of a software application.

The phrase "program of a software application" here designates a succession of instructions which, when they are read and executed by microprocessor 11, enable the implementation of a certain application function. According to a specific embodiment, the function of the certain application is a finite pulse response filtering function.

"Debugger" here designates a tool for searching for the malfunctions of a software application having its program read and executed by a microcontroller, for example, microcontroller 1. More particularly, a debugger enables to execute step-by-step the program of the application, for example, stored in flash memory 2 of microcontroller 1, to display, and possibly to modify variables of the program, etc. Certain debuggers even enable to access the contents of internal registers of microprocessor 11, memories of microcontroller 1, and/or registers of microcontroller 1, for example, registers for programming the microcontroller functions.

The case where a program of a first application is stored in flash memory 2 is considered as an example, the first application having been developed by a first entity, for example, a developer, a firm, a microcontroller vendor, etc. Microcontroller 1 is then supplied to a second entity, for example, another developer, another firm, a user, etc. The second entity may desire to develop a program of a second application to store it into flash memory 2 to implement the second application by means of the microcontroller. During the development of the program of the second application, the second entity may use a debugger. The use of a debugger is considered as an intrusion capable of allowing the access, by the second entity, to information relative to the program of the first application. Now, in certain cases, it is desirable for the second entity not to be able to access information relative to the first application already programmed or installed in memory 2, particularly by using a debugger. Another intrusion capable of allowing the access to information relative to the program of the first application is the execution of a boot program originating from the outside, for example, executed from RAM 12.

Preferably, microcontroller 1 is configured to detect such intrusions.

As an example, an intrusion corresponding to the connection of a debugger to microcontroller 1 may be detected by a microcontroller detection circuit. The circuit may then modify the value of an intrusion flag, for example, a bit for controlling bus 13, accessible to at least certain elements of microcontroller 1, and in particular to flash memory 2, to notify the connection of the debugger to these elements. As an example, such a detection circuit is provided in each interface 14 of microcontroller 1 to which a debugger may be connected, for example, a JTAG (Join Test Action Group) bus interface or a SWD bus (Serial Wire Debug) interface 14 and, more generally, a bus interface enabling to implement so-called boundary scan techniques.

As an example, an intrusion corresponding to the execution of a boot program other than that stored in memory 2 may be detected by microcontroller 1 and an indication of the detection of this intrusion may be supplied to flash memory 2. Indeed, the address at which the boot program to be executed by the microprocessor is stored is supplied by options stored in memory 2, these options being analyzed upon booting of microcontroller 1 by a boot controller (not shown in FIG. 1). The boot controller is preferably configurable to authorize or not the execution of a boot program according to the address where this program is stored.

Although this has not been shown in FIG. 1, microcontroller 1 is here partitioned into two environments, that is, a secure environment (Secure World—SW) and a non-secure environment (Non-secure World—NSW). A program or a circuit belonging to secure environment SW may access, in read mode, in write mode, and in execution mode, to addresses of the secure environment SW and optionally of the non-secure environment NSW. However, a program or a circuit belonging to the non-secure environment NSW may only access, in read mode, in write mode, and in execution mode, addresses belonging to the non-secure environment NSW. More particularly, in microcontroller 1, during a read, write, or execution access to an address, bus 13 comprises an indication of the secure (SA—Secure Access) or non-secure (NSA—Non-secure Access) character, or type, of this access. A secure access SA is, for example, requested or initiated by a program or a circuit of the secure environment SW, and a non-secure access NSA is, for example, requested or initiated by a program or a circuit of the non-secure environment NSW. As an example, the partitioning of microcontroller 1 into two SW and NSW environments may be implemented by means of the technology designated under trade name TrustZone.

When a debugger is connected to microcontroller 1, it may initiate, from the outside of the microcontroller, an SA-type or NSA-type access to an internal address of the microcontroller, the access request being, for example, received by the interface 14 having the debugger connected thereto, which is then configured to transmit the access request to bus 13 of the microcontroller.

Figure 2:
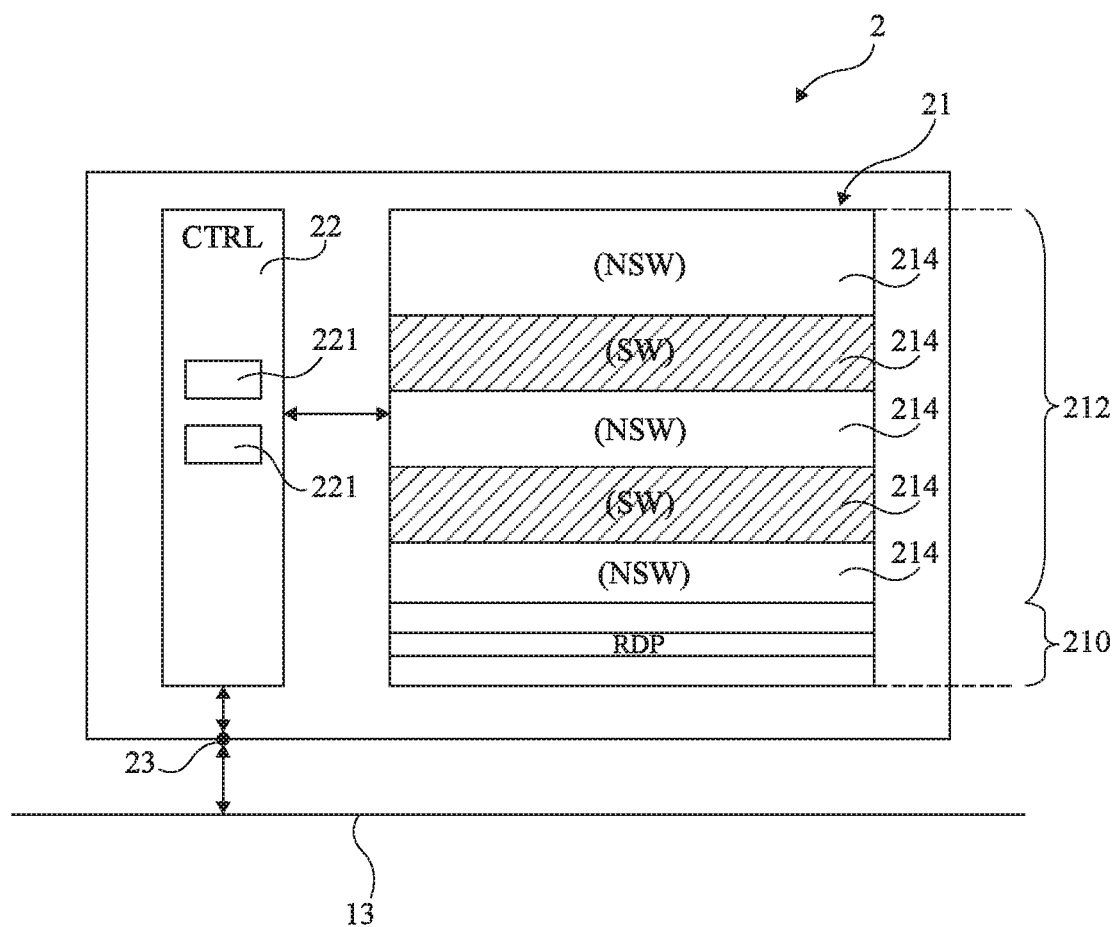
FIG. 2 schematically shows an embodiment of a non-volatile memory of the microcontroller of FIG. 1.

FIG. 2 schematically shows an embodiment of the flash memory 2 of the microcontroller of FIG. 1.

Memory 2 comprises a non-volatile storage space, or memory space, 21, for example formed of a plurality of addressable memory words. Memory 2 further comprises an interface circuit 22 (CTRL) configured to control the read, write, and execution accesses to memory space 21.

Memory space 21 is divided, or partitioned, into a plurality of portions, two portions 210 and 212 in the present example. Portion 210 is configured to store information of configuration of memory 2. Portion 212 is configured to store software application programs. Each portion 210, 212 of memory space 21 is defined and/or identified by parameters such as its beginning address, its size, that is, its number of memory words, and/or its end address. Data representative of these parameters are non-volatilely stored into memory 2, preferably in portion 210 thereof.

As an example, the boot program of microcontroller 1 is stored in portion 212 of memory space 21. As a variation, memory space 21 may comprise a third portion reserved to the storage of the boot program of microcontroller 1.

In this embodiment, portion 212 of memory space 21 is divided, or partitioned, into a plurality of sectors or areas 214. Preferably, each area 214 comprises, or corresponds to, a plurality of memory words. In other words, each area 214 corresponds to a plurality of addresses, preferably successive. Each area 214 is defined and/or identified by parameters such as its beginning address, its size, and/or its end address. Data representative of these parameters are non-volatilely stored into memory 2, preferably in portion 210 thereof.

In this embodiment, areas 214 respectively belong to the secure environment SW or non-secure environment NSW. Thus, each area 214 may be of a first type, SW, or of a second type, NSW, SW-type areas 214 being indicated by hatched lines in FIG. 2. Information representative of the secure SW or non-secure NSW character of each area 214 is non-volatilely stored in memory 2, preferably in portion 210 thereof. Preferably, in an initial state of memory 2, that is, when memory 2 is blank, it only contains areas 214 of secure type SW.

As an example, it is here provided for secure application programs to be stored in SW-type areas 214 and thus to belong to the secure environment SW of microcontroller 1, and for non-secure or public application programs to be stored in NSW-type areas 214 are thus to belong to the non-secure environment NSW of microcontroller 1.

In this embodiment, the value of a variable RDP (Read Out Protection) is selected from among at least four values, preferably from among four values. Information representative of the value of variable RDP is non-volatilely stored in memory 2, preferably in portion 210 thereof as shown in FIG. 2.

Circuit 22 of memory 2 is, for example, connected between storage space 21 and inputs/outputs 23 of memory 2, inputs/outputs 23 being configured to be connected to bus 13 as shown in FIG. 2.

When an access to an area 214 is requested by bus 13, circuit 22 conditions the access to area 214 according to the value of variable RDP, according to the type, SW or NSW, of area 214, according to the secure SA or non-secure NSA character of the access, and/or, possibly, according to the detection or not of an intrusion and/or to the fact that the access has not been initiated by a debugger.

Preferably, circuit 22 also controls the programming, or storage, into memory 2, of the information relative to the configuration of memory 2, such information being representative of the partitioning of memory space 21 into portions 210 and 212, of the division of portion 212 into areas 214, of the SW or NSW type of each area 214, and/or of the value of variable RDP. Preferably, the modification of the SW or NSW type of an area 214 can only be performed by means of a secure access SA of bus 13 to memory 2. As an example, the modification of value RDP may be performed by means of a secure access SA or of a non-secure access NSA of bus 13 to memory 2.

In this example, circuit 22 comprises one or a plurality of volatile storage registers 221, two registers 221 being shown in FIG. 2. Registers 221 are configured to store information relative to the configuration of memory 2 after circuit 22 has read them from memory space 21.

As a variation, circuit 22 comprises one or a plurality of non-volatile storage circuits having the information representative of the partitioning of memory space 21 into portions 210 and 212, of the division of portion 212 into areas 214, of the type, SW or NSW, of each area 214, and/or of the value of variable RDP, stored therein. In this case, it is possible for the information not to be stored in memory space 21.

The way in which circuit 22 conditions the access to an area 214 according to its SW or NSW type, according to the value of variable RDP, and/or according to the SA or NSA type of the access will now be described in further detail in relation with FIG. 3.

Figure 3:
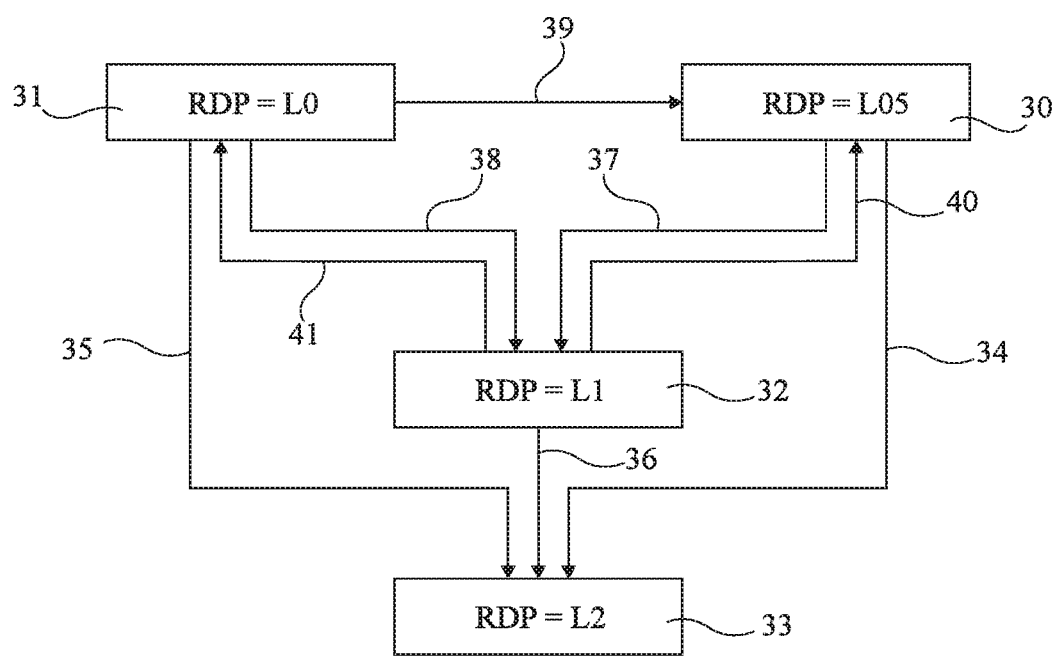
FIG. 3 illustrates, in the form of blocks, an embodiment of a method of access to areas of the memory of FIG. 2.

FIG. 3 illustrates in the form of blocks an embodiment of a method of managing the operation of the microcontroller, for example determining the control of the access to areas 214 of memory 2 of FIG. 2, circuit 22 being preferably configured to implement this method.

In this example, the value of variable RDP is selected from among four values L0, L05, L1, and L2. The method then comprises four states 30 (block RDP=L05), 31 (block RDP=L0), 32 (block RDP=L1), and 33 (block RDP=L2) corresponding to the cases where the value of variable RDP is respectively L05, L0, L1, and L2.

Whatever the state 30, 31, 32, or 33, a non-secure access NSA to a secure area SW is forbidden, for example, denied by circuit 22.

In state 30, the access, even secure SA, to a secure area SW is forbidden when it originates from a debugger connected to microcontroller 1. However, the secure access SA to a secure area SW is authorized if it does not originate from a debugger. Further, the access to an area NSW is authorized, be it secure, SA, or non-secure, NSA, and whether it originates or not from a debugger connected to microcontroller 1.

Thus, in state 30, a debugger can only access NSW-type areas. It is then possible to identify, by means of the debugger, the malfunctions of a software application having its program stored in a NSW non-secure area 214, while keeping secure another software application having its program stored in a SW secure area 214.

As an example, in state 30, the interface 14 having the debugger connected thereto is configured, for example, after the reading of the value of variable RDP, to transmit to bus 13 none of the SA-type accesses initiated from the outside of microcontroller 1 by the debugger. Thus, none of the secure accesses SA seen by circuit 22 can originate from the debugger.

In state 31, the secure access SA to a SW secure area is authorized, for example, by circuit 22, even if it originates from a debugger connected to microcontroller 1. Further, the access to an NSW non-secure area is authorized, for example, by circuit 22, be this access secure SA or non-secure NSA, and whether or not it originates from the debugger. In other words, in state 31, the debugger can access all the areas 214 of memory 2.

As an example, in state 31, the interface 14 having the debugger connected thereto is configured, for example, after the reading of the value of variable RDP, to transmit to bus 13 all the accesses initiated from the outside of microcontroller 1 by the debugger, be the accesses secure SA or non-secure NSA. The debugger should however initiate the right access, that is, a secure access SA to access a SW secure area and a secure SA or non-secure NSA access to access an NSW non-secure area, the debugger being configured to manage the type, SA or NSA, of access that it initiates.

In state 32, when an intrusion is detected, for example, the connection of a debugger to microcontroller 1, no access (secure SA or non-secure NSA) to SW-type and NSW-type areas 214 is authorized by circuit 22. However, if no intrusion is detected, secure accesses SA to SW-type and optionally NSW-type areas 214 are authorized and non-secure accesses NSA are only authorized to NSW non-secure areas. Thus, in state 32, the detection of an intrusion, in particular the connection of a debugger to the microcontroller, results in that memory 2 is no longer accessible, which enables to protect the content thereof. However, in the absence of connection of a debugger, the applications programmed on the microcontroller may be executed by respecting the partitioning between the secure SW and non-secure NSW environments of the microcontroller.

Preferably, in state 32, microcontroller 1, and more specifically its boot controller, is configured, for example, after the reading of the value of variable RDP, to prevent the execution of a boot program other than that which is stored in memory 2.

In state 33, the connection of a debugger to microcontroller 1 is deactivated, for example, by blocking, preferably definitively, the access to the buses of microcontroller 1 that can be used by the debugger. As an example, this is implemented at the level of each interface 14 associated with a bus enabling to execute a debugger by deactivating, as an example, the clock of these interfaces, when the value of variable RDP is L2. Further, the execution of a boot program from another source than flash memory 2 is also deactivated, for example, by the boot controller of microcontroller 1, which then only transmits to microcontroller 1 the address of the boot program stored in memory 2. Further, in state 33, a secure access SA to a SW-type or optionally NSW-type area 214 is authorized, and a non-secure access NSA to an NSW-type or SW-type area 214 is respectively authorized and forbidden.

According to the described method, only certain changes, or reprogramming, of the value of variable RDP by circuit 22 are authorized, a change in the value of variable RDP causing a corresponding change of state after resetting of the product.

In particular, in this embodiment, changes from state 30, 31, and 32 to state 33 (FIG. 3, respective arrows 34, 35, and 36) are authorized. However, changes from state 33 to any of states 30, 31, and 32 are forbidden. State 33 is thus an irreversible or, in other words, definitive state. Further, a change from state 30 or 31 to state 32 (FIG. 3, respective arrows 37 and 38), or from state 31 to state 30 (FIG. 3, arrow 39) is authorized.

In this embodiment, a change from state 32 to state 30 (FIG. 3, arrow 40) is also authorized and causes the deleting of all NSW non-secure areas 214. Thus, when a program stored in a SW-type area 214 has been executed in state 32, such a state change causes the deleting of possible data and/or instructions stored in an NSW non-secure area 214 after the transition to state 30. This enables to avoid for such data to be read by a debugger in a state 30, the accesses of a debugger to NSW non-secure areas 214 being authorized in state 30.

In the shown example, a change from state 32 to state 31 (FIG. 3, arrow 41) is authorized and causes the deleting of all areas 214. This enables to avoid for a program stored in a secure area 214 SW to become accessible to a debugger connected to microcontroller 1, the accesses of a debugger to secure areas SW 214 being authorized in state 31.

In an alternative embodiment, not shown, a change from state 30 to state 31 is authorized and causes the deleting of all areas 214.

In the above method, when a read or write access to an area 214 is required while this access is forbidden, circuit 22 may generate an error signal on bus 13, optionally causing the interruption of the program which is being executed.

The method described to control the access to areas 214 according to the value of variable RDP, according to the NSW or SW type of the areas, according to the secure, SA, or non-secure, NSA, character of the access, and/or, possibly, according to the detection or not of an intrusion and/or according to the origin of the access, that is, to whether the access has or not been initiated by a debugger connected to microcontroller 1, may be extended to control read, write, and/or execution accesses in all of microcontroller 1. Indeed, from the viewpoint of microprocessor 11, all the elements of microcontroller 1 which are connected to bus 13 are seen as addresses which may belong to the respective secure, SW, and non-secure, NSW, environments. It is here provided to distribute the addresses seen by microprocessor 11 into addresses of SW type, or category, and into addresses of NSW type, or category. The access to these addresses is then conditioned according to the value of variable RDP, to their categories SW and NSW, to the secure, SA, or non-secure, NSA, character of the access, and/or, possibly, to the detection or not of an intrusion, and/or to the origin of the access (debugger or not).

Figure 4:
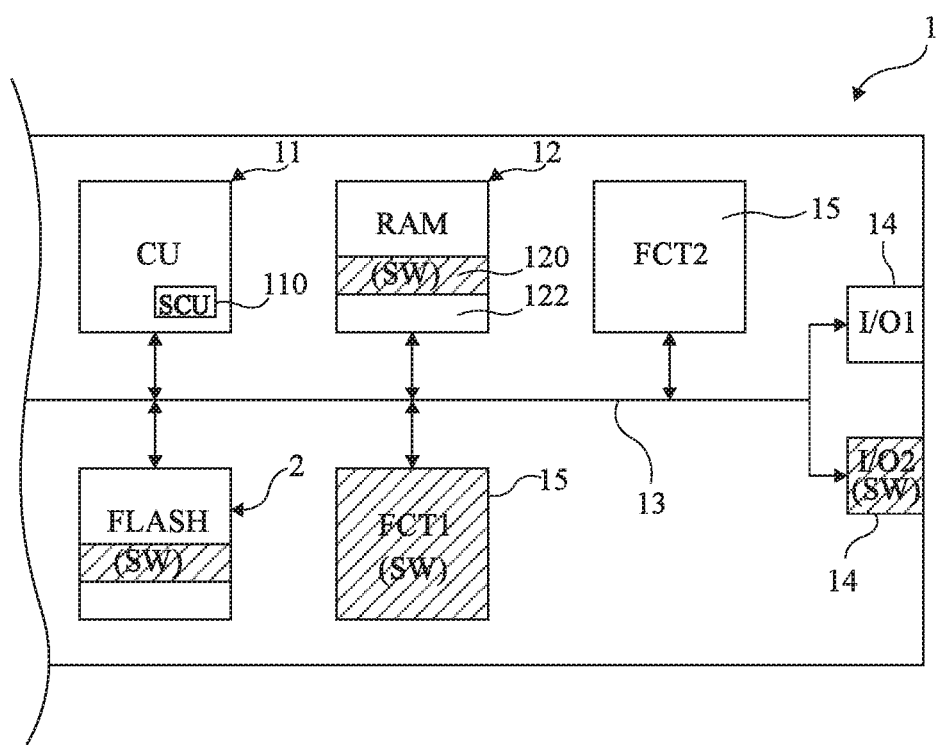
FIG. 4 schematically shows in the form of blocks another embodiment of the microcontroller of FIG. 1 where an alternative embodiment of the method of FIG. 3 is implemented.

FIG. 4 schematically shows in the form of blocks another embodiment of microcontroller 1 of FIG. 1 where an alternative embodiment of the method of FIG. 3 is implemented.

As compared with the microcontroller shown in FIG. 1, two interfaces 14 I/O1 and I/O2 of microcontroller 1 have been shown and two functions FCT1 and FCT2 of microcontroller 1 have been shown (blocks 15). Further, an access control circuit 110 (block SCU—Security Control Unit) of microprocessor 11 has been shown. Circuit 110 comprises at least one storage circuit (not shown), for example, registers or a volatile memory.

Flash memory 2 is of the type described in relation with FIG. 2 and implements the method described in relation with FIG. 3.

In the shown example, the addresses seen by microprocessor 11, and in particular by its circuit 110, which correspond to function FCT1, to interface I/O2, to a portion 120 of RAM 12, and to the SW-type areas of flash memory 2, are secure addresses SW and are symbolized by hatchings in FIG. 4, the other addresses, in particular those corresponding to the other portions 122 of RAM 12, being NSW non-secure addresses.

Circuit 110 is configured to record, in its storage circuit, the SW or NSW category of each address seen by microprocessor 11. This circuit is, for example, configured by the execution of the boot program stored in memory 2, the boot program supplying it with the partitioning of microcontroller 1 into SW secure and NSW non-secure environments.

When the method of access to areas 214 of flash memory 2 is implemented by circuit 22 of flash memory 2 (FIG. 2), circuit 110 is configured to: condition the accesses to SW secure and NSW non-secure addresses in the same way as circuit 22 conditions the accesses to the respectively secure and non-secure areas 214 SW and NSW; condition the switching from an NSW non-secure address into a SW secure address and from a SW secure address into an NSW non-secure address in the same way as circuit 22 conditions the switching respectively from an NSW non-secure area to a SW secure area and from a SW secure area to an NSW non-secure area; and delete the content of SW secure addresses and of NSW non-secure addresses in the same way as circuit 22 deletes the content respectively of SW secure areas 214 and of NSW non-secure areas 214.

Preferably, on switching from state 32 to 30 (arrow 40 in FIG. 3), that is, upon a change of the value of variable RDP from value L1 to value L05, a deleting of all the non-volatile memories of the microcontroller and/or a reboot of the microcontroller are further provided.

The implementation of such a method enables to secure, generally in microcontroller 1, a program stored in a SW secure area 214 of flash memory 2.

Various embodiments and variations have been described. It will be understood by those skilled in art that certain features of these various embodiments and variations may be combined, and other variations will occur to those skilled in the art. In particular, it will be within the abilities of those skilled in the art to implement the above-described methods in the more general case where the debugger is replaced with any program or circuit external to microcontroller 1 which requires accesses to areas 214 or internal addresses of microcontroller 1.

Finally, the practical implementation of the described embodiments and variations is within the abilities of those skilled in the art based on the functional indications given hereabove. In particular, although this has not been described, requests for reprogramming the value of variable RDP and/or for reprogramming the type of an area 214 are received by memory 2 via bus 13. As an example, the change, or reprogramming, of the value of variable RDP is requested either by the user code executed by microcontroller 1, or from the outside of microcontroller 1, via an interface 14, for example, the interface to which the debugger is connected, called debug interface. However, preferably, the change, or reprogramming, of the SW or NSW type of an area of memory 2, can only be requested via a secure access to the memory and may, if this action originates from a debugger, depend on the value of variable RDP.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method, comprising:
configuring a non-volatile memory of a microcontroller to include a secure memory area and a non-secure memory area;
storing a protection variable in the non-volatile memory, said protection variable having a value selected from among at least four values, wherein each value of the at least four values specifies conditions for accessing the secure memory area and non-secure memory area based on a level of security for the access and a source of the access; and
conditioning access by said source to the non-volatile memory based on the value of the protection variable stored in the non-volatile memory;
wherein when the protection variable has a fourth value, said conditioning comprises, if the source of the access is a debugger connected to the microcontroller, blocking access to data buses connected to the non-volatile memory.

2. The method of claim 1, wherein when the protection variable has a first value, said conditioning comprises, if the source of the access is a debugger connected to the microcontroller, blocking access to the secure memory area and permitting access to the non-secure memory area.

3. The method of claim 2, wherein said conditioning further comprises, if the source of the access is not a debugger connected to the microcontroller, permitting access to the secure memory area if the level of security for the access is a secure access.

4. The method of claim 2, further comprising permitting a change of the protection variable from the first value to a third value, wherein the third value would condition access, if the source of the access is a debugger connected to the microcontroller, by permitting the access to the secure memory area and the non-secure memory area, and further comprising, in response to the change then deleting both the secure memory area and the non-secure memory area of the non-volatile memory.

5. The method of claim 1, wherein when the protection variable has a second value, said conditioning comprises, if the source of the access is a debugger connected to the microcontroller, blocking access to both the secure memory area and the non-secure memory area.

6. The method of claim 5, further comprising permitting a change of the protection variable from the second value to a first value, wherein the first value would condition access, if the source of the access is a debugger connected to the microcontroller, by blocking access to the secure memory area and permitting access to the non-secure memory area, and further comprising, in response to the change, deleting the non-secure memory area of the non-volatile memory.

7. The method of claim 1, wherein when the protection variable has a second value, said conditioning comprises, if the source of the access is a detected intruder connected to the microcontroller, blocking access to both the secure memory area and the non-secure memory area.

8. The method of claim 7, further comprising permitting a change of the protection variable from the second value to a first value, wherein the first value would condition access, if the source of the access is a debugger connected to the microcontroller, by blocking access to the secure memory area and permitting access to the non-secure memory area, and further comprising, in response to the change, deleting the non-secure memory area of the non-volatile memory.

9. The method of claim 7, further comprising detecting the intruder from a reading of a microcontroller boot program from a source other than the non-volatile memory.

10. The method of claim 1, wherein when the protection variable has a third value, said conditioning comprises, if the source of the access is a debugger connected to the microcontroller, permitting the access to the secure memory area and the non-secure memory area.

11. The method of claim 10, further comprising permitting a change of the protection variable from the third value to a second value, wherein the second value would condition access, if the source of the access is a debugger connected to the microcontroller, by blocking access to the non-volatile memory, and further comprising, in response to the change, deleting both the secure memory area and the non-secure memory area of the non-volatile memory.

12. The method of claim 1, wherein when the protection variable has the fourth value, said conditioning further comprising, if the level of security for the access is a secure access, permitting access to the secure memory area and, if the level of security for the access is a non-secure access, permitting access to the non-secure memory area.

13. The method of claim 1, wherein when the protection variable has the fourth value, said conditioning further comprising blocking booting of the microcontroller from a source other than the non-volatile memory.

14. The method of claim 1, further comprising prohibiting a change of the protection variable from the fourth value to any other of the at least four values.

15. The method of claim 1, further comprising:
non-volatilely programming in the microcontroller or in a microcontroller boot program, for each address seen by a microprocessor of the microcontroller, security information representative of whether the address is part of the secure memory area or the non-secure memory area; and
conditioning access to said address according to the level of security for the access in comparison to the programmed security information.

16. The method of claim 15, wherein conditioning access comprises authorizing the access to the address with security information that is secure only if the access is a secure access and authorizing the access to the address with security information that is non-secure if the access is a non-secure access.

17. A method, comprising:
configuring a non-volatile memory of a microcontroller to include a secure memory area and a non-secure memory area;
storing a protection variable in the non-volatile memory, said protection variable having a value selected from among at least four values, wherein each value of the at least four values specifies conditions for accessing the secure memory area and non-secure memory area based on a level of security for the access and a source of the access; and
conditioning access by said source to the non-volatile memory based on the value of the protection variable stored in the non-volatile memory;
wherein conditioning comprises, if the protection variable has a first value and if the source of the access is a debugger connected to the microcontroller, blocking access to the secure memory area and permitting access to the non-secure memory area;
wherein conditioning comprises, if the protection variable has a second value and if the source of the access is the debugger connected to the microcontroller, blocking access to both the secure memory area and the non-secure memory area; and
permitting a change of the protection variable from the second value to a first value, if the source of the access is the debugger connected to the microcontroller, by deleting contents of the non-secure memory area of the non-volatile memory, blocking access to the secure memory area and permitting access to the non-secure memory area.

18. The method of claim 17, wherein, if the protection variable has the first value and the source of the access is not a debugger connected to the microcontroller, conditioning further comprises permitting access to the secure memory area if the level of security for the access is a secure access.

19. The method of claim 18, further comprising permitting a change of the protection variable from the first value to a third value, wherein the third value would condition access, if the source of the access is a debugger connected to the microcontroller, by deleting both the secure memory area and the non-secure memory area of the non-volatile memory and permitting the access to the secure memory area and the non-secure memory area.

20. The method of claim 17, wherein, if the protection variable has the second value and the source of the access is a detected intruder connected to the microcontroller, conditioning comprises blocking access to both the secure memory area and the non-secure memory area.

21. The method of claim 20, further comprising permitting a change of the protection variable from the second value to the first value, by deleting contents of the non-secure memory area of the non-volatile memory, blocking access to the secure memory area and permitting access to the non-secure memory area.

22. The method of claim 20, further comprising detecting the intruder from a reading of a microcontroller boot program from a source other than the non-volatile memory.

23. The method of claim 17, wherein conditioning comprises, if the protection variable has a third value and the source of the access is the debugger connected to the microcontroller, permitting the access to the secure memory area and the non-secure memory area.

24. The method of claim 23, further comprising permitting a change of the protection variable from the third value to the second value, by deleting both the secure memory area and the non-secure memory area of the non-volatile memory and blocking access to the non-volatile memory.

25. The method of claim 17, wherein conditioning comprises, if the protection variable has a fourth value and the source of the access is the debugger connected to the microcontroller, blocking access to data buses connected to the non-volatile memory.

26. The method of claim 25, when the protection variable has the fourth value, said conditioning further comprising, if the level of security for the access is a secure access, permitting access to the secure memory area and, if the level of security for the access is a non-secure access, permitting access to the non-secure memory area.

27. The method of claim 25, when the protection variable has the fourth value, said conditioning further comprising blocking booting of the microcontroller from a source other than the non-volatile memory.

28. The method of claim 25, further comprising prohibiting a change of the protection variable from the fourth value to any other of the at least four values.

29. The method of claim 17, further comprising:
- non-volatilely programming in the microcontroller or in a microcontroller boot program, for each address seen by a microprocessor of the microcontroller, security information representative of whether the address is part of the secure memory area or the non-secure memory area; and
- conditioning access to said address according to the level of security for the access in comparison to the programmed security information.

30. The method of claim 29, wherein conditioning access comprises authorizing the access to the address with security information that is secure only if the access is a secure access and authorizing the access to the address with security information that is non-secure if the access is a non-secure access.

* * * * *